United States Patent [19]
Valente

[11] Patent Number: 5,836,220
[45] Date of Patent: Nov. 17, 1998

[54] LOCKING DIFFERENTIAL WITH PIN ACCESS WINDOW

[75] Inventor: Paul J. Valente, Berkley, Mich.

[73] Assignee: Tractech Inc., Warren, Mich.

[21] Appl. No.: 842,824

[22] Filed: Apr. 17, 1997

Related U.S. Application Data

[63] Continuation-in-part of Ser. No. 754,170, Nov. 25, 1996, Pat. No. 5,715,733.

[51] Int. Cl.$^6$ ..................................................... F16H 48/12
[52] U.S. Cl. ............................................................ 74/650
[58] Field of Search .................................................. 74/650

[56] References Cited

U.S. PATENT DOCUMENTS 2,555,044  5/1951  Lewis .
5,413,015  5/1995  Zentmyer .
5,715,733  2/1998  Dissett ...................................... 74/650
5,727,430  3/1998  Valente ...................................... 74/650

*Primary Examiner*—Dirk Wright
*Attorney, Agent, or Firm*—Laubscher & Laubscher

[57] ABSTRACT

A locking differential including a pair of clutch members, a pair of associated annular side gears, a drive rod extending between the clutch members, and a pair of spacers arranged between the side gears and drive rod is characterized by a locking pin, disc, E-clip, spring assembly which urges the clutch members outwardly apart toward engaged positions with the side gears. The face of each clutch member contains at least one pin bore for receiving a locking pin and at least one oversized spring bore for receiving a spring. The outer periphery of each clutch member contains a pin access opening communicating with each pin bore. During assembly, a tool can be inserted into the pin access opening to displace the locking pin contained therein, whereby the E-clip may he installed on a locking pin circumferential groove and the associated spring is maintained in compression, thereby to urge the clutch members axially outwardly apart.

9 Claims, 5 Drawing Sheets

LOCKING DIFFERENTIAL WITH PIN ACCESS WINDOW

CROSS REFERENCE TO RELATED APPLICATION

This is a continuation-in-part of application Ser. No. 08/754,170 filed in the name of Walter L. Dissett Nov. 25, 1996, now U.S. Pat. No. 5,715,733 and is related to application Ser. No. 08/736,480 filed in the name of Paul J. Valente Oct. 24, 1996 now U.S. Pat. No. 5,727,430.

BACKGROUND OF THE INVENTION

1. Field of the Invention

The present invention relates to locking differentials for motor vehicles and, more particularly, to a locking, differential having a pair of clutch members which are biased axially outwardly apart by a plurality of pin-disc-clip-spring assemblies which are accessed via circular pin access windows contained in the outer periphery of the clutch members.

2. Brief Description of the Prior Art

Locking differentials are known in the patented prior art. The U.S. patent to Lewis U.S. Pat. No. 2,555,044, for example, discloses a differential mechanism which includes a driving spider member, a pair of driven gear members, a pair of clutch members, and a pair of disabling rings which cooperate with the respective gear members to disengage the clutch members from the respective gear members when one drive wheel over-runs the other, such as when the vehicle is rounding a curve. The opposed faces of the clutch members include a pair of diametrically positioned pins and pin recesses and recessed springs. The springs normally urge the clutch members axially outwardly to cause the clutch teeth to engage the teeth of the associated gear member. The pin recesses are slightly larger than the pins to permit, but ultimately check, slight relative rotation of the clutch members. Assembly of this differential is awkward, difficult, and time consuming.

The Zentmyer U.S. Pat. No. 5,413,015 discloses an automatic locking differential including a drive shaft which serves to drive a pair of driving clutch members. The driving clutch members, in turn, are in driving relationship with a pair of associated driven clutch members which serve to drive the driven clutch members. The driving clutch members and driven clutch members are urged in contact by spring assemblies including two oppositely wound concentric springs which bear against an associated pin. The spring assemblies and pins are contained in spring and pin recesses respectively, contained in the opposing faces of the driving clutch members. Each pin recess includes an inspection opening and each spring recess includes a spring access opening through which the spring assembly is inserted during installation. One drawback of this two-concentric spring differential is that a high decree of manual dexterity is required to install the loosely arranged spring pair through the spring access opening, since the inner spring limits the bending flexibility of the outer spring. In addition since the two concentric springs are loosely arranged, there exists the possibility of dropping one or more of the relatively small springs during the retrofit assembly of the differential within a consumer's existing casing, or of losing one of the springs during the unpacking of the various loose components of the differential kit prior to assembly and installation.

The present invention was developed to overcome these and other drawbacks of the prior devices by providing an improved automatic locking differential in which pin-clip-disc-spring assemblies are used to urge the clutch members outwardly apart into engagement with a pair of associated side gears.

SUMMARY OF THE INVENTION

Accordingly, a primary object of the present invention is to provide a locking differential including a plurality of pin-clip-disc-spring assemblies arranged between a pair of clutch members which serve to limit the extent of angular rotational displacement of the clutch members relative to each other and which further serve to urge the clutch members outwardly apart toward engagement with a pair of associated side gears. The adjacent faces of the clutch members each contain at least one pin bore and at least one oversized spring bore, and the outer periphery of each member contains a radially-inwardly-directed circular pin access opening in communication with each pin bore. Each pin is slidably mounted in a corresponding pin bore and is axially slidably displaceable between a retracted inoperable position and an extended operable position wherein the pin-clip-disc-spring assembly cooperates to urge the clutch members axially outwardly into engagement with their respective side gears.

It is another object of the invention to provide a locking differential in which the locking pin can he displaced during assembly by a screwdriver inserted through the pin access opening.

It is yet another object of the present invention to provide a locking differential which is easy and inexpensive to manufacture and easy to install.

BRIEF DESCRIPTION OF THE DRAWINGS

Other objects and advantages of the invention will become apparent from a study of the following specification when viewed in light of the accompanying drawings, in which.

DETAILED DESCRIPTION

Figure 1:
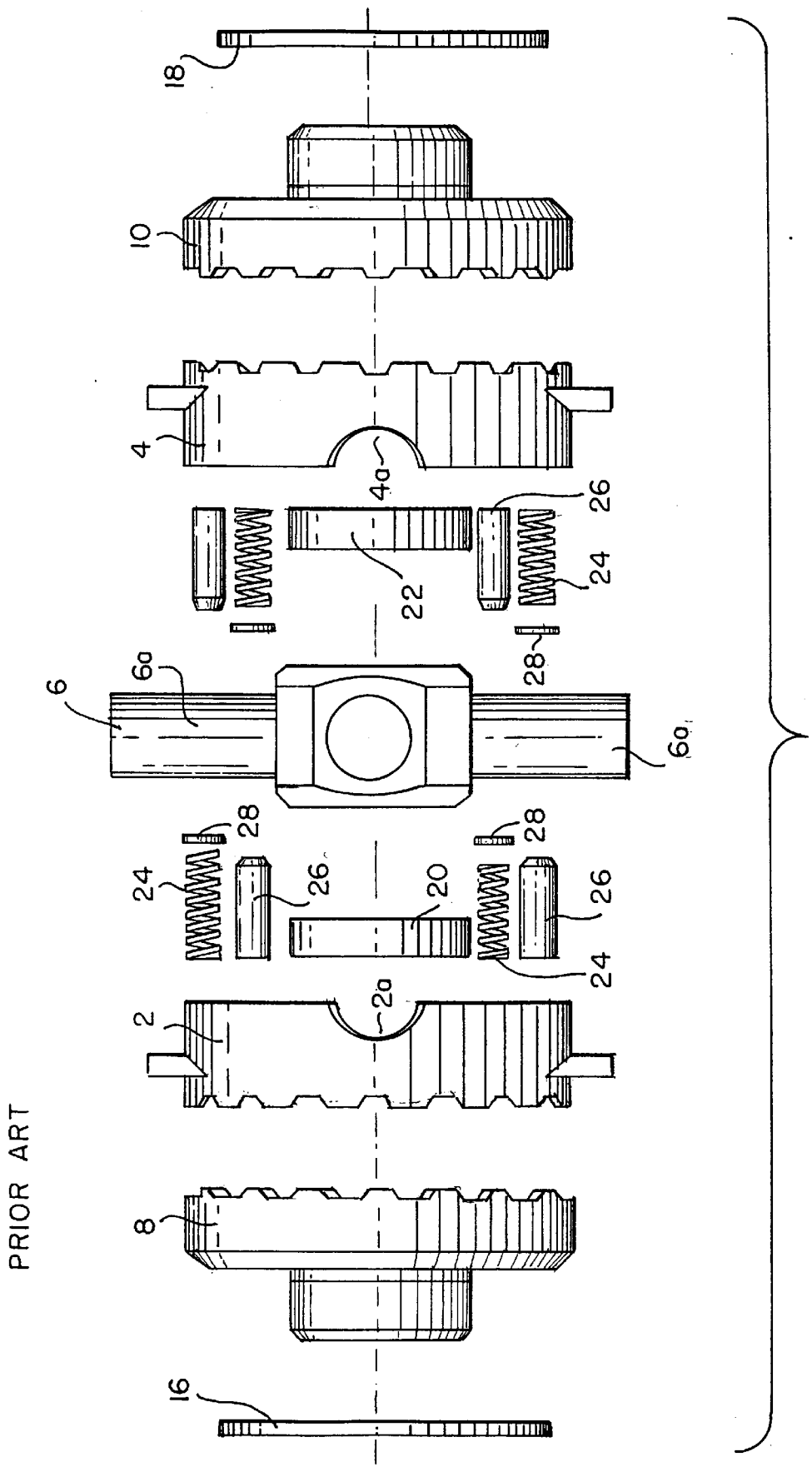
FIG. 1 is an exploded view of a first locking differential according to the prior art.

Referring first to FIG. 1, an early prior art version of a locking differential includes a pair of annular clutch members 2,4 having diametrically arranged drive grooves 2a,4a for receiving the orthogonally arranged arms 6a of a central drive rod member 6, the ends of the arms being mounted in a differential casing (not shown). The clutch members 2,4 have at their remote ends gear teeth that normally engage corresponding gear teeth on the adjacent ends of a pair of side gears 8,10 that are splined on the adjacent ends of a pair of output axles or shafts (not shown). Annular thrust washers 12,14 are arranged between the side gears 8,10 and the adjacent wall surfaces of the casing chamber, and annular spacer members 16,18 are arranged between the side gears 8,10 and the drive rod 6, respectively. The annular clutch members are biased axially apart toward engaged positions relative to the side gears 8,10 respectively, by four biasing assemblies each including a helical spring 20, a locking pin 22, and a spring disc or washer 24 arranged between the adjacent ends of the spring and the pin. At one end, the locking pin is mounted in a corresponding pin bore contained in one face of a clutch member, and at its other end, the locking pin extends partially within an oversized spring bore contained in the opposing face of the other clutch member.

Figure 2:
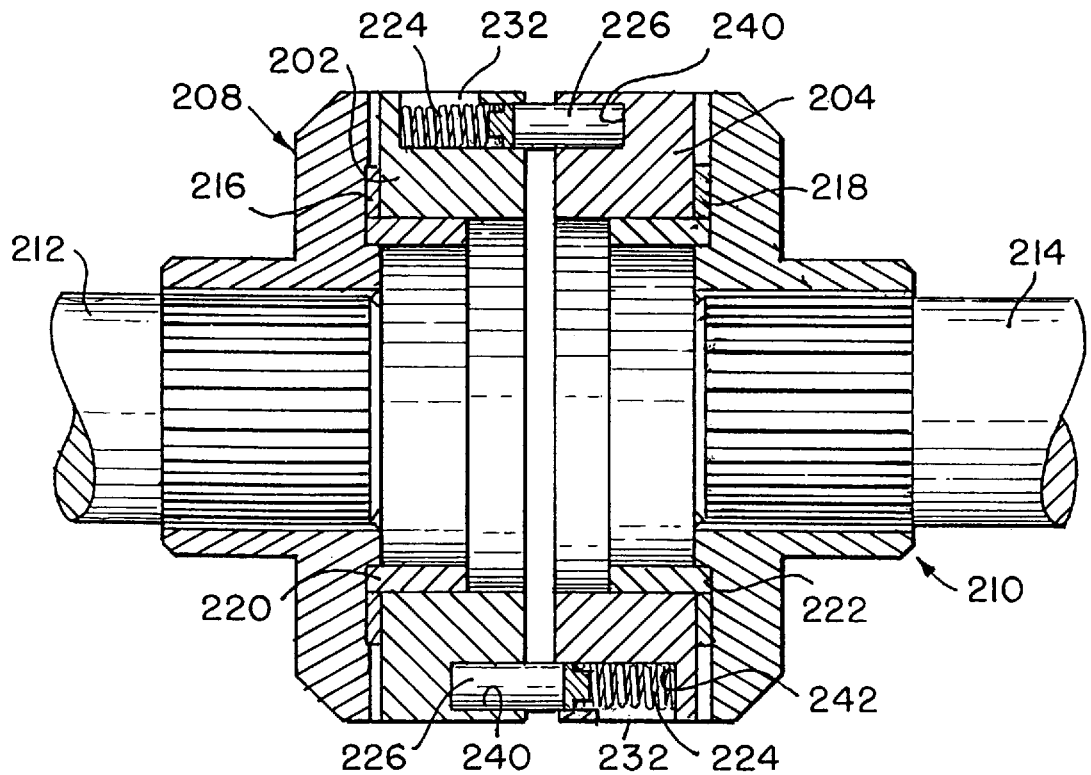
FIG. 2 is a longitudinal sectional view of a second locking differential according to the prior art.
Figure 3:
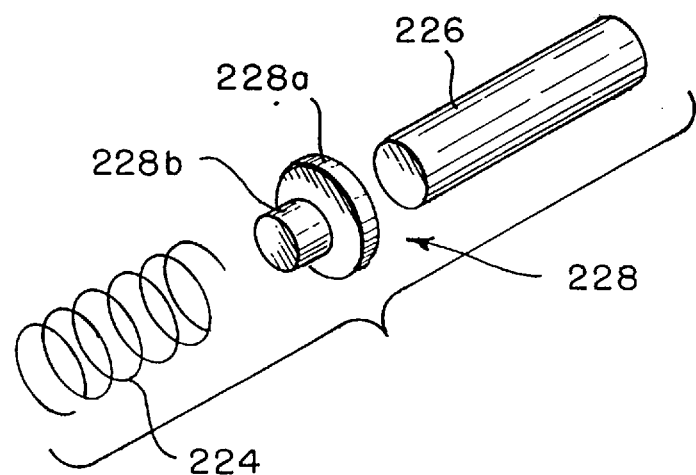
FIG. 3 is an exploded view of one of the spring biasing assemblies of FIG. 2.
Figure 4:
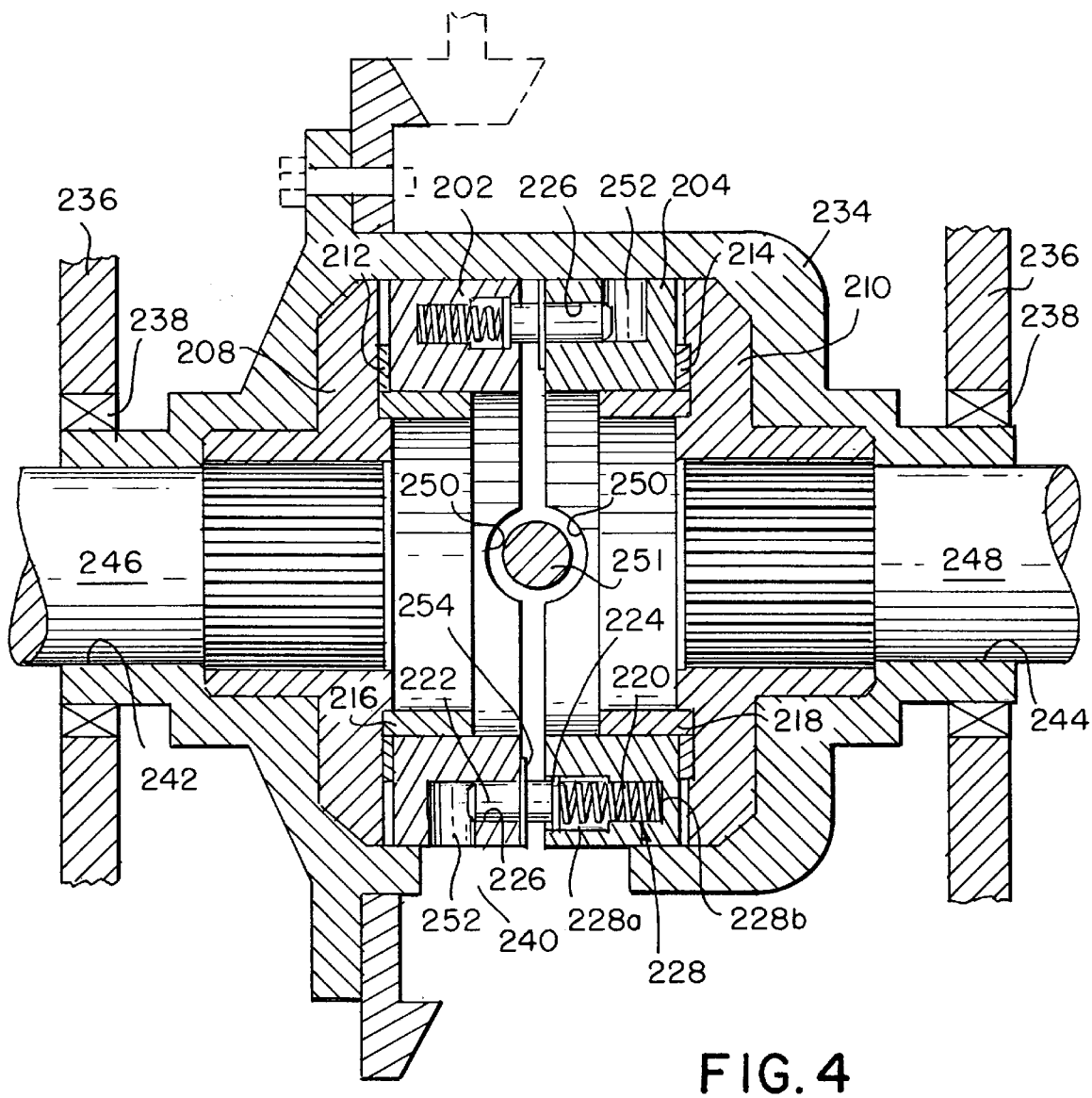
FIG. 4 is a longitudinal sectional view of the locking differential of the present invention.
Figure 5:
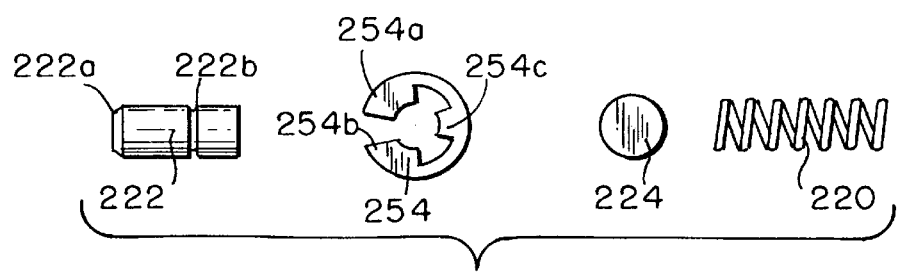
FIG. 5 is an exploded view of one of the pin-clip-disc-spring assemblies of FIG. 4.

A second locking differential according to the prior art shown in FIGS. 2 and 3 includes a pair of annular clutch members 102,104, a pair of annular side gears 108,110 arranged on opposite sides of the clutch members, a pair of annular thrust washers 112,114 arranged between the clutch members and side gears, a diametrically extending drive rod 106 arranged between the clutch members, and a pair of annular spacer members 116,118 arranged between the side gears and the drive rod. A plurality of locking pins 122 are mounted in corresponding pin bores 126 contained in the faces of the clutch members and a plurality of spring assemblies are mounted in oversized spring bores 128 contained in the adjacent face of the other clutch member. Four such spring assemblies are provided to bias the clutch members axially apart toward engaged positions relative to the side gears, each assembly including a helical spring 120, and a spring cap 130 mounted on and carried by one end of the spring, the spring cap including a disc portion 130a which bears against the adjacent ends of the spring 120 and the locking pin 122, and a cylindrical plug portion 130b that extends with a friction fit within the adjacent end of each spring. Each clutch member further includes a spring access opening 132 contained in its outer periphery which communicates with an oversized spring bore and allows the spring, with the cap member mounted thereon, to be introduced into the oversized bore during, assembly of the device.

Referring now to FIGS. 4–7, the differential apparatus according to the present invention including a rotatably driven casing 234 rotatably supported within a housing 236 by hearings 238. The differential casing includes a conventional access opening 240 affording access to the interior chamber of the casing. A pair of annular clutch members 202,204 are collinearly arranged within the casing 234 at axially spaced locations adjacent a pair of openings 242,244 contained in the opposed walls of the casing which receive output axles or shafts 246,248, respectively. The clutch members are adapted for insertion within the casing chamber via the casing access opening 240.

Figure 6:
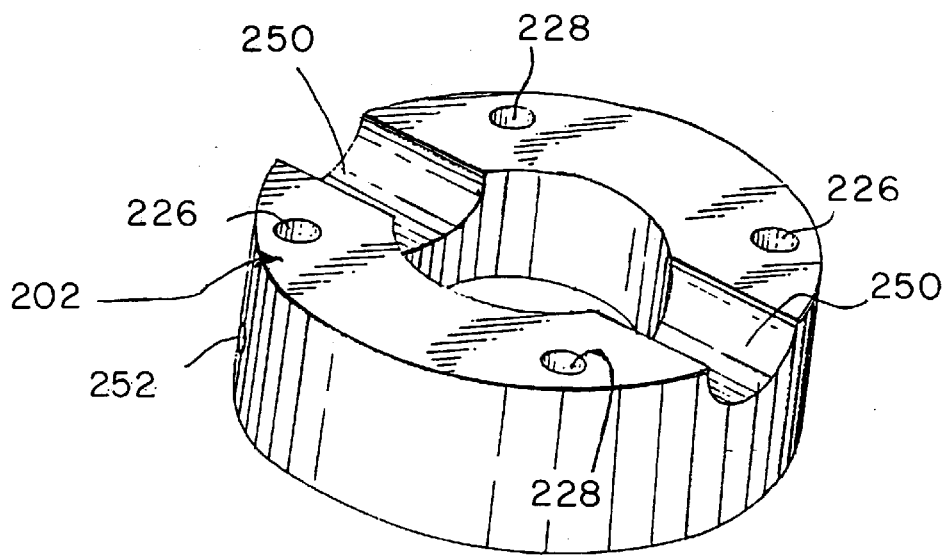
FIG. 6 is a perspective top view of one of the clutch members of FIG. 4.
Figure 7:
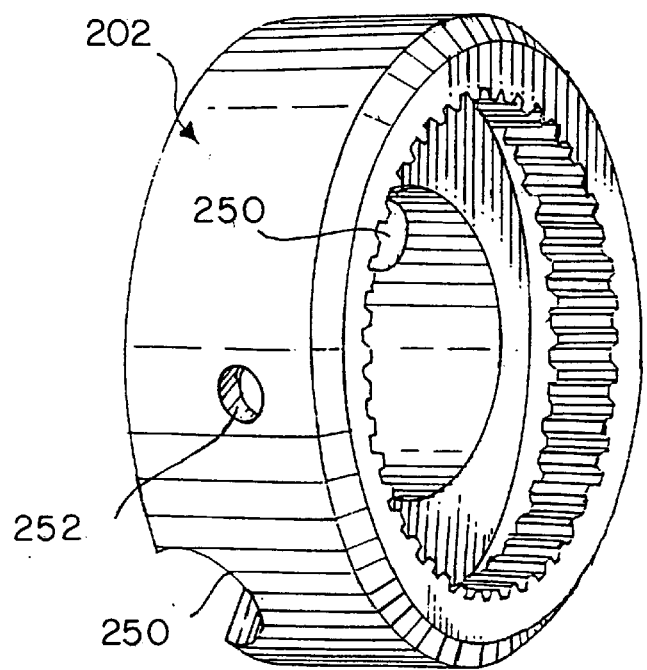
FIG. 7 is a perspective end view of one of the clutch members of FIG. 4.

As best shown in FIGS. 6 and 7, the adjacent faces of the clutch members contain, as is known in the art, at least one pair of diametrically arranged drive grooves 250 which have a cross-sectional configuration which operates in conjunction with a drive rod 251 (similar to the cross-pin 6 of FIG. 1) to cause the clutch member associated with an overrunning shaft to disengage, thereby causing the overrunning shaft to disengage from the associated clutch member. The adjacent faces of each clutch member further contain a pair of pin bores 226 and a pair of oversized spring bores 228 which have a diameter which is larger than the diameter of the pin bores. The outer periphery of each clutch member contains a radially inwardly directed circular pin access opening 252 in communication with each pin bore 226. The pin access openings have a circular cross-sectional configuration to simplify machining of the clutch members. Each oversized spring bore 228 includes a large diameter outer portion 228a in communication with the respective clutch member face, and a second small diameter inner portion 228b having a diameter for receiving the spring 220.

The drive rod 251 is arranged between the clutch members 202,204 and extends within the drive grooves 250. The remote ends of the drive rod extend radially outwardly beyond the clutch members and are mounted in corresponding opposed openings in the differential casing. The drive rod 251 preferably has a circular cross-sectional configuration, and the diameter of the generatrix of the drive grooves is greater than the diameter of the drive rod.

A pair of annular side gears 208,210 are arranged collinearly with and on opposite sides of the clutch members. The adjacent ends of the side gears include gear teeth that normally engage corresponding gear teeth on the remote ends of the clutch members. A pair of annular thrust washers 212,214 are arranged between side gear 208 and clutch member 202 and between side gear 210 and clutch member 204, respectively. Side gears 208,210 are internally splined on the adjacent ends of the output axles or shafts 246,248, respectively, for non-rotatable connection therewith.

A pair of annular spacers 216,218 are arranged between the side gears 208,210 and the drive rod and serve to limit the extent of axial displacement of the side gears relative to the drive rod.

In accordance with a characterizing feature of the invention, the clutch members 202,204 are biased axially apart toward engaged positions relative to the side gears 208,210, respectively, by four biasing assemblies each including a locking pin 222, an E-clip retainer 254, a helical spring 220, and a disc 224 arranged between the adjacent ends of the spring and the locking pin. At one end, the locking pin is mounted in a corresponding pin bore 226 contained in one face of a clutch member, and at its other end, the locking pin extends within an oversized spring bore 228 contained in the opposing face of the other clutch member. Each spring is arranged within the bottom portion 228b of an oversized spring bore 228, with the disc 224 being arranged in hearing relation between the adjacent ends of the spring 220 and the locking pin 222, whereby the spring urges the locking pin toward its retracted position. Thus, during operation of the locking differential, the oversized spring bore permits lateral sliding movement between the locking pin and the associated spring disc without affecting the spring, and further permits limited angular displacement between the overrunning clutch member and the other clutch member. The locking pin 222 includes a chamfered end portion 222a which extends toward the bottom of the pin bore adjacent the pin access opening 252. As described more fully below, chamfered end portion 222a allows the locking pin to be axially displaced by means of the tip of a screwdriver inserted into the pin access opening 252.

Figure 8:
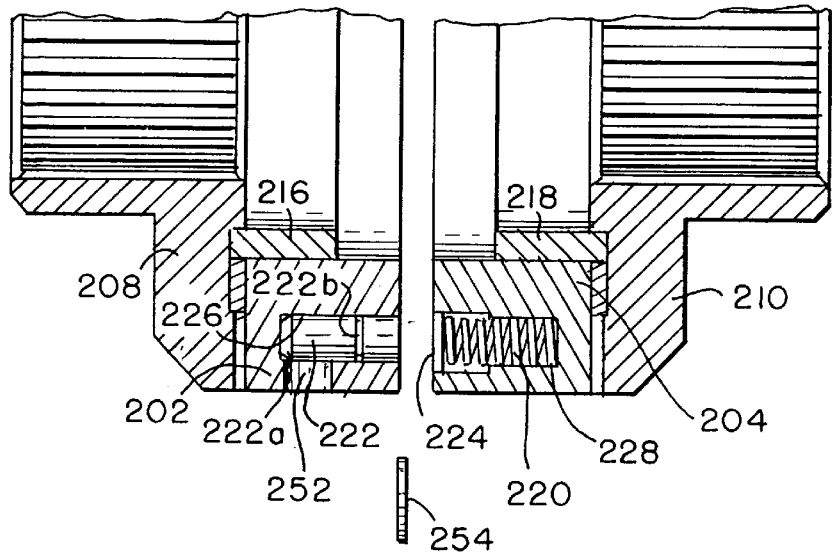
FIGS. 8 and 9 are detailed views showing the manner in which the locking pin-clip-disc-spring assembly is installed in the differential of FIG. 4.
Figure 9:
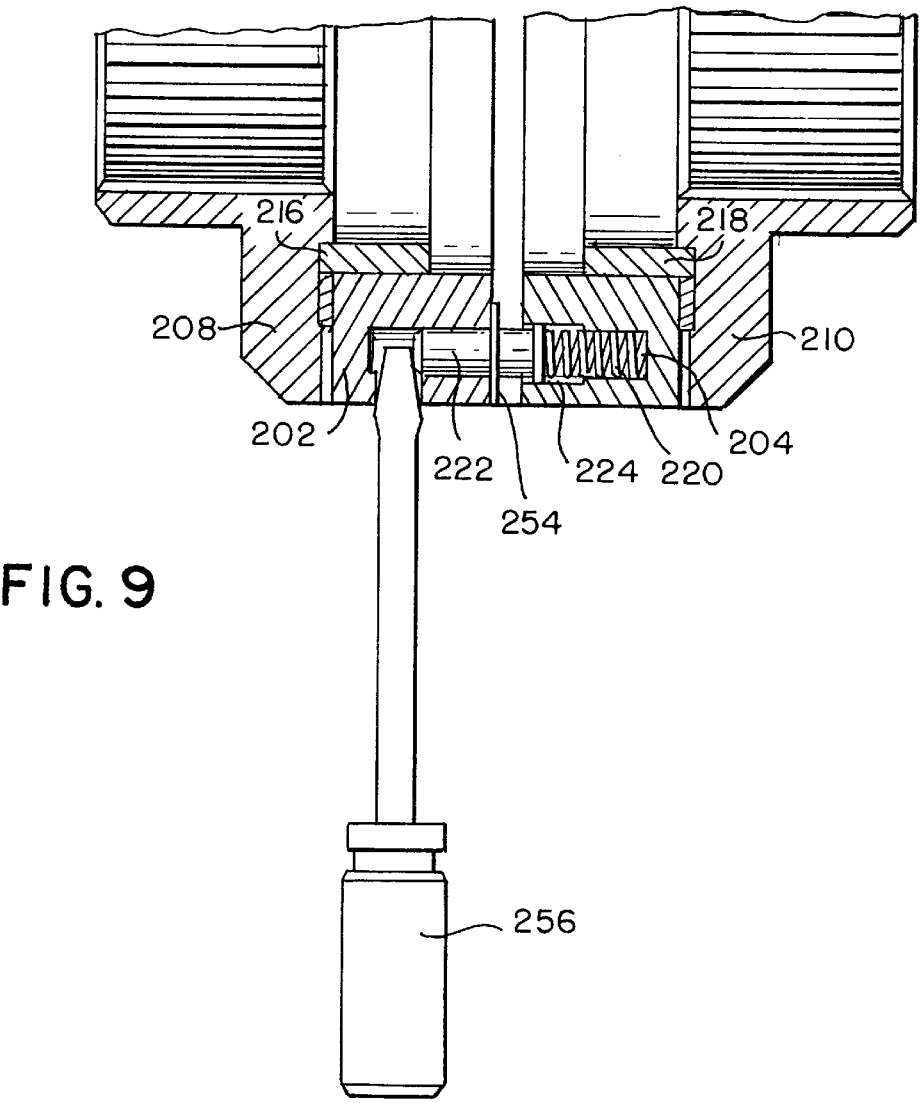

As shown in FIGS. 8 and 9, each locking pill is axially slidably displaceable between a retracted inoperable position wherein the locking pin is contained generally within its associated pin bore 226 (FIG. 8) and an extended operable position wherein the locking pin is axially displaced and extends partially within a corresponding aligned spring bore 228 contained in the opposing face of the other clutch member (FIG. 9). Each locking pin further contains a circumferential groove 222b for receiving an E-clip. Each E-clip includes three portions 254a, 254b, and 254c that removably extend within the associated circumferential groove and serve to engage the face of the associated clutch member adjacent the pin bore, thereby to maintain the locking pin in its extended operable position and to urge the clutch members outwardly into engagement with the associated side gear.

INSTALLATION

To assemble the differential, the locking pin 222, disc 224, and spring 220 are installed in each clutch before the clutches are installed in the differential casing. Accordingly, two springs are first installed in respective oversized spring bores of each clutch. A disc is then affixed to the exposed end of each spring using a suitable adhesive such as, for example, grease. The locking pins are then inserted into the two pin bores contained in each clutch member. The locking pins are inserted chamfered end first such that the chamfered end portion 222a is adjacent the pin access opening 252. Grease or another suitable adhesive may be used to hold the locking pins in their respective pin bores.

Next, the side gears 208,210, clutch assemblies 202,204 (including the springs, discs, and locking pins), thrust washers 212,214, and spacers 216,218 are installed in the differential case 234 via the casing access opening 240 as shown in FIG. 8. The springs are then compressed by inserting a suitable tool, such as a screwdriver 256, into the pin access opening 252 to engage the chamfer 222a of the locking pin. The chamfer acts as a ramp and allows the pin to be axially displaced toward the other clutch, thereby compressing the spring contained in the opposing clutch. The locking pin is displaced until the circumferential groove 222a is visible between the two clutches, whereby an E-clip 254 is snapped onto the locking pin via the groove as shown in FIG. 9. Once the E-clip is installed on the locking pin and the screwdriver is removed, the E-clip engages the clutch member face adjacent the pin bore, thereby maintaining the spring in compression. The compressed spring, in turn, serves to urge the clutch members axially outwardly apart. The steps of displacing the locking pin with the screwdriver and installing the E-clip on the pin is then repeated for each of the pin-disc-spring assemblies. While four such assemblies have been described, it will be recognized that fewer or more such assemblies may be used.

While in accordance with the provisions of the Patent Statutes the preferred forms and embodiments of the invention have been illustrated and described, it will be apparent to those of ordinary skill in the art that various changes and modifications may be made without deviating from the inventive concepts set forth above.

What is claimed is:

1. A locking differential for driving a pair of collinearly-arranged axially-spaced output shafts the adjacent ends of which extend through aligned shaft openings contained in the opposed walls of a hollow differential casing, said casing containing an access opening affording access to the casing chamber, comprising:

(a) a pair of annular collinearly-arranged axially-spaced clutch members adapted for insertion within the casing chamber via the casing access opening to axially spaced positions between, and collinearly aligned relative to the axis of, the casing shaft openings, respectively, the adjacent faces of said clutch members containing at least one pair of diametrically arranged drive grooves, at least one pin bore, and at least one oversized spring bore, and further wherein each said clutch member contains in its outer periphery a radially inwardly directed pin access opening communicating with each pin bore;

(b) a pair of generally annular side gears collinearly arranged with, and on opposite sides of said clutch members, said side gears being internally splined for non-rotatable connection with the output shafts, respectively, said side gears and said clutch members having adjacent faces provided with cooperating clutch teeth, respectively, said clutch members being axially displaceable inwardly and outwardly toward disengaged and engaged positions relative to said side gears, respectively;

(c) a diametrically extending drive rod arranged between said clutch members and extending within said drive grooves, respectively, the remote ends of said drive rod extending radially outwardly beyond said clutch members for connection with said differential casing, the width of said drive grooves being greater than the diameter of said drive rod and said drive grooves having a cross-sectional configuration such as to cause disengagement of the clutch member associated with an output shaft that overruns the other output shaft beyond a given amount, thereby to disengage the overrunning shaft from the associated clutch member;

(d) spring means arranged in each said oversized spring bore for urging said clutch members outwardly axially apart toward said engaged position;

(e) locking means for limiting the extent of angular rotational displacement of said clutch members relative to each other, said locking means including a plurality of locking pins each having a first end slidably mounted in a corresponding pin bore, each said locking pin being axially slidably displaceable between a retracted inoperable position wherein said locking pin is contained generally within said pin bore with said first end opposite said pin access opening, and an extended operable position wherein said locking pin is axially displaced to extend at its other end partially within a corresponding aligned spring bore contained in the opposing face of the other clutch member, thereby to compress the associated spring means arranged therein, whereby upon the insertion of the tip of a screwdriver into said pin access opening, said pin may be displaced from said retracted inoperable position to said extended operable position; and (f) clip means for maintaining said locking pin in said extended operable position.

2. Apparatus as defined in claim 1, wherein each said locking pin contains intermediate its ends a circumferential groove, and further wherein said clip means is removably mounted in said circumferential groove, whereby when each said locking pin is maintained in its extended operable position, said clip engages said clutch member face adjacent an associated pin bore.

3. Apparatus as defined in claim 2, wherein said clip means includes an E-clip.

4. Apparatus as defined in claim 3, wherein said spring means includes a helical spring.

5. Apparatus as defined in claim 4, wherein said locking pin first end is chamfered.

6. Apparatus as defined in claim 1, wherein said oversized spring bore includes a first portion in communication with said clutch face having a first diameter and a second portion in communication with said pin access opening having a second diameter, said first diameter being greater than second diameter.

7. Apparatus as defined in claim 1, wherein said pin access opening is cylindrical.

8. Apparatus as defined in claim 1, and further including an intermediate isolating member arranged between said spring and the adjacent end of said locking pin, said isolating member having a planar surface extending normal to the axis of, and engaged by, said locking pin, thereby to permit lateral sliding movement of said pin relative to said spring.

9. Apparatus as defined in claim 8, wherein said isolating member comprises a circular planar disc, said disc having a diameter less than said spring bore first diameter and greater than said spring bore second diameter.

* * * * *